United States Patent
Meidan et al.

(10) Patent No.: US 7,397,821 B2
(45) Date of Patent: Jul. 8, 2008

(54) DATA ERROR DETECTION AND MITIGATION SYSTEMS AND SUPPORTING METHOD AND APPARATUS

(75) Inventors: Amir Meidan, Chicago, IL (US); Michael D. Johns, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 568 days.

(21) Appl. No.: 11/017,442

(22) Filed: Dec. 20, 2004

(65) Prior Publication Data
US 2006/0133380 A1  Jun. 22, 2006

(51) Int. Cl.
*H04L 1/00* (2006.01)
(52) U.S. Cl. .................... 370/474; 370/476; 714/48; 714/746
(58) Field of Classification Search ............ 370/394, 370/474, 476; 714/48, 51, 52, 703, 708
See application file for complete search history.

(56) References Cited

U.S. PATENT DOCUMENTS

| | | | |
|---|---|---|---|
| 5,629,948 A * | 5/1997 | Hagiwara et al. | 714/748 |
| 5,652,760 A * | 7/1997 | Yamashita et al. | 714/704 |
| 5,799,039 A | 8/1998 | Laird et al. | |
| 6,671,518 B2 | 12/2003 | Harris et al. | |
| 7,136,929 B2 * | 11/2006 | Koprivica | 709/232 |
| 7,246,302 B2 * | 7/2007 | Kim | 714/769 |

* cited by examiner

*Primary Examiner*—Wing F. Chan
*Assistant Examiner*—Duc T Duong

(57) ABSTRACT

A data error detection and mitigation system has been provided with a tiered approach. A set of received (104) data frames, which are ordered, are divided (106) into multiple groups, wherein at least one of the groups includes at least two nonconsecutive data frames. With these multiple groups, a data error check is inserted (108) for at least one of these groups. The data frames can relate to various types of information, such as audio, speech, video, images, files, or any data format with substantial similarity between successive frames.

10 Claims, 7 Drawing Sheets

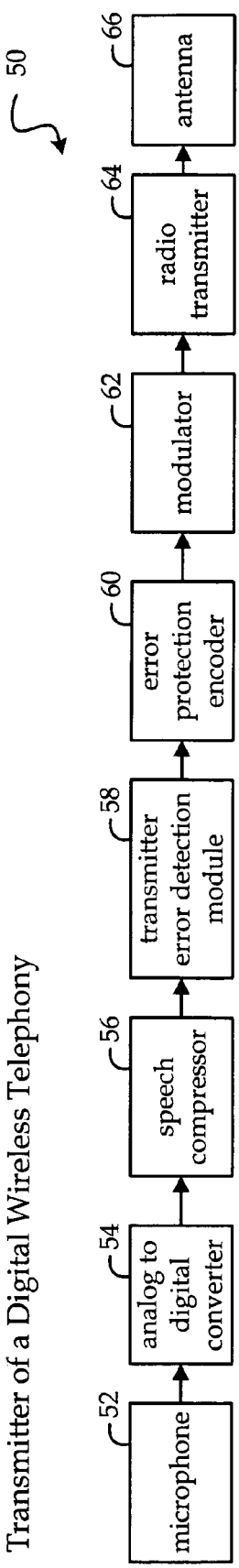
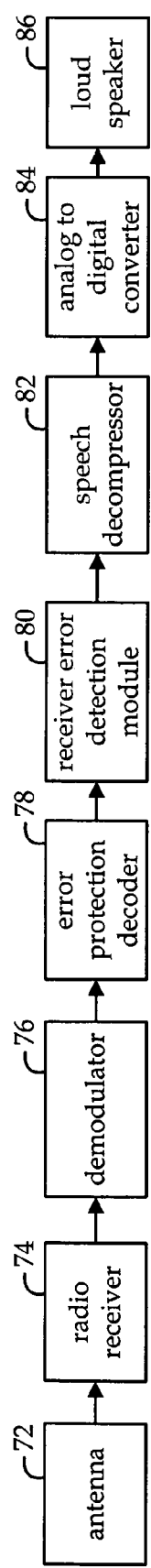
FIG. 2
FIG. 3

DATA ERROR DETECTION AND MITIGATION SYSTEMS AND SUPPORTING METHOD AND APPARATUS

TECHNICAL FIELD

This invention relates generally to data error detection and mitigation systems.

BACKGROUND

Data transfer errors are a major concern within any communication system. For example, efficient detection of these errors is quite challenging, because error checks cost the system resources, such as bandwidth. As a result, a fewest number of error detection mechanisms are preferred in any given system.

The problem is, however, that when too many bit errors corrupt a data packet, the corrupted data is preferably mitigated instead of using the corrupted packet. At the same time, proper mitigation of the corrupted data packet becomes more difficult when fewer error detection mechanisms are implemented. In particular, when an error is found during a data error check, the entire data block is typically found to be corrupted, even though the error is generated by a small portion of the entire data block. Thus, the more data error checks that are implemented, which divide the data packets into smaller data blocks, the more likely that mitigation of corrupted data can be performed more smoothly, because uncorrupted data are less likely to be tossed out in the system. This benefit, however, is gained at the cost of system resources. As a result, there is a tradeoff between accuracy and system resources.

This is especially problematic in cellular communication systems where multiple speech frames are delivered within a single data packet, and voice quality is a key concern in such a system. For example, mitigation in existing systems, such as iDEN, employs a single Cyclic Redundancy Check ("CRC") for each data packet to detect data errors during transmission. The detected errors are then mitigated to reduce their effect. Mitigation in the iDEN® system generally takes one of two forms of either repetition or muting. Repetition uses the last known good packet, while muting generates so-called "comfort noise" instead of the corrupted packet. In cases where repetition is preferred over muting, repetition, unfortunately, is usually only good for one or two corrupted packets, after which the repeated audio packet becomes stale and its use constitutes an unacceptable audio artifact. In other words, when the repeated audio is too remote from its original location in the sequence, the quality of the overall audio-stream is more degraded when outputted to the user.

Since each audio data packet contains multiple speech frames, an error detection mechanism is ideally implemented for each of the speech frames to guarantee that all the corrupted speech frames can be accounted for. This method, however, requires too much bandwidth, which is generally limited in a cellular system. Because the current iDEN system uses only one CRC for each data packet to detect errors due to bandwidth constraints, some of the data may be valid, despite the error detection from the CRC. Uncorrupted data, as a result, are being unnecessarily replaced. Moreover, with the use of a single CRC for each data packet, the system is limited to a single-tiered mitigation approach.

BRIEF DESCRIPTION OF THE DRAWINGS

The above needs are at least partially met through provision of the error detection and mitigation method and apparatus described in the following detailed description, particularly when studied in conjunction with the drawings, wherein:

FIG. 2 comprises a block diagram of a transmitter in a digital wireless telephony system according to various embodiments of the invention;

FIG. 3 comprises a block diagram of a receiver in a digital wireless telephony system according to various embodiments of the invention;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a plurality of ordered data frames are divided into multiple groups for detection of a data error in each of the groups. One or more of the groupings contains at least two data frames that are nonconsecutive to each other. These multiple groups, according to one embodiment, have a substantially equal number of data frames, and the two nonconsecutive data frames are spaced according to a predefined number of frames. In another embodiment, the ordered data frames along with the derived data frames are consecutively assembled before output.

According to another embodiment, any detected data errors for the multiple groups are mitigated by replacing the data frame(s) in a group with the detected error with a derived data frame that is substantially adjacent to each of the data frame(s). The derived data frame can be a data frame that is immediately previous or next to the data frame being replaced.

Pursuant to such embodiments, an improved data error detection and mitigation technique is provided by the invention. For example, through the use of detection in each of the multiple groups, less of the valid data is excluded along with the bad data. Moreover, nonconsecutive data frames allow for more valid repetitions in cases where muting would have been necessary. As a result, the overall audio effect of mitigation is reduced, and the audio artifacts are compensated more seamlessly. Effectively, a tiered approach of error detection and mitigation is provided that allows for an increase in voice quality. The associated mitigation audio artifact is greatly reduced, since more repetitions are used in place of muting the distorted data. The audio artifacts are also replaced with derived data frames that are closer to the original data frames in the sequence, rather than a single large block of the data being either repeated or muted. These and other benefits will become more evident to those skilled in the art upon making a thorough review and study of the following detailed description.

Figure 1:
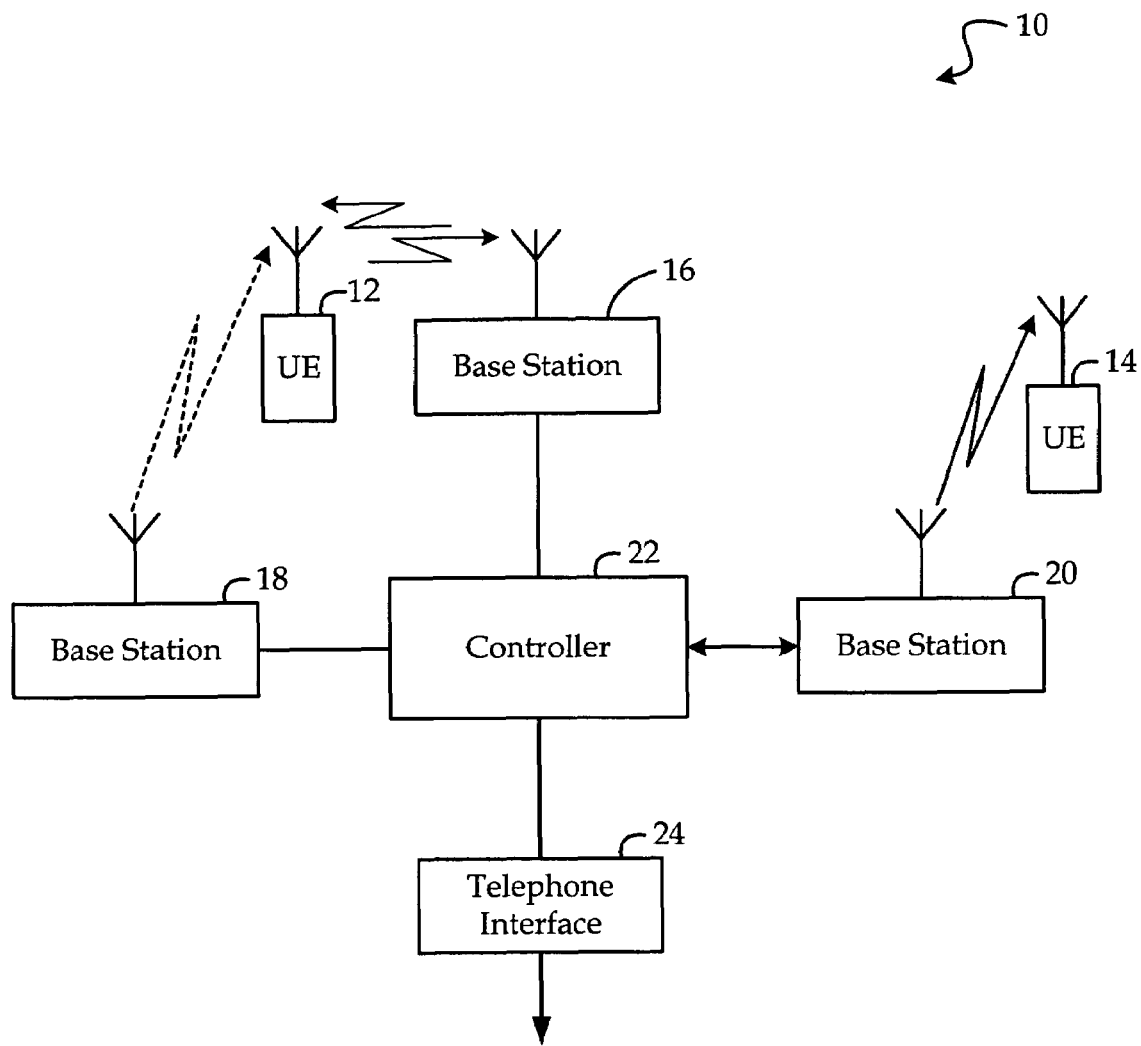
FIG. 1 comprises a block diagram of a typical wireless communication system suitable for various embodiments of the invention.

Referring now to the drawings, and in particular to FIG. 1, for purposes of providing an illustrative but nonexhaustive example to facilitate this description, a specific operational paradigm using a Time Division Multiple Access (TDMA) communication network will be presented. Those skilled in the art will recognize and appreciate that the specifics of this illustrative example are not specifics of the invention itself and that the teachings set forth herein are applicable in a variety of alternative settings.

Pursuant to this example, a TDMA communication system 10 is shown. In a TDMA system, each item of user equipment 12, 14, such as a mobile unit, is allocated a unique time slot within each single radio-frequency (RF) channel. This TDMA digital transmission scheme multiplexes three signals over a single channel. The user equipment 12, 14, in turn, interfaces with multiple base stations 16, 18, 20 using a TDMA protocol or air interface protocol, such as the Integrated Digital Enhanced Network (iDEN®) protocol in the iDEN® system. The geographic coverage area of the system 10 is divided into regions or cells, which are each serviced by one of the base stations 16, 18, 20. As an item of user equipment 12, for example, moves from one cell area to another, a handoff may be necessary from one base station 16 to another base station 18 to maintain the best or an acceptable signal quality between the user equipment and the base station. A controller 22 is included to handle the interfaces between the user equipment 12, 14 and the base stations 16, 18, 20. The controller 22 is further connected to a telephone interface 24, such as a public switch telephone network. Numerous other communication systems and networks are contemplated by these teachings, the current TDMA system is shown as an exemplary implementation according to various embodiments.

Referring to FIG. 2, a block diagram of a transmitter in a digital wireless telephony system according to one embodiment is shown and indicated generally at 50. A digital wireless telephony system is presented as an exemplary implementation of the user equipment 12, 14 shown in FIG. 1. However, other implementations of the user equipment 12, 14, such as a personal digital assistant, can also be used, and they are within the scope of the present teachings. Thus, the present teachings are not limited to audio, voice, speech, and video data transmitted through telephony. Effectively, any data format with substantial similarity between successive frames is contemplated, which can also include any image or file data. Moreover, these teachings can also be implemented in other transmitters, such as one in a base station of the system. These teachings can further be implemented in network controllers, such as a radio network controller, a radio access network, or a mobile switching center.

As with most typical digital wireless telephony system, a microphone 52 for receiving raw analog data (e.g., speech data), an analog to digital converter 54 for converting the analog data into digital data, and finally a speech compressor 56 to compress the digital data. In this embodiment, the compressed digital data are checked by a transmitter error detection module 58 that may include multiple data error checks, such as a cyclic redundancy check (CRC). Other data error checks, such as a checksum, may be used, and the use of these various error checks along with their specific implementation will be readily appreciated by one skilled in the art. As a result, they are understood to be within the scope of the present teachings. Using the CRC example, the error protection bits are encoded within the compressed data by an error protection encoder 60. The compressed data along with the error protection bits are then modulated by a modulator 62, and the modulated data are then transmitted through a radio transmitter 64 and an antenna 66 to a receiver, such as the base stations 16, 18, 20 shown in FIG. 1.

On the opposite side, FIG. 3 shows a block diagram of a receiver in a digital wireless telephony system, which is indicated generally at 70. Similar to the transmitter, these teachings are not limited to a digital wireless telephony system. Other receiver implementations, such as ones located in the base stations, radio network controllers, radio access networks, or mobile switching centers, in the system, are also contemplated. These various implementations are readily appreciated by one skilled in the art, and they are within the scope of the present teachings. As with most typical digital wireless telephony systems, the receiver generally includes an antenna 72 operably coupled to a radio receiver 74 to receive the modulated data from the transmitter. A demodulator 76 accordingly demodulates the modulated data. Since in the CRC implementation shown, the expected data are encoded with error protection bits, an error protection decoder 78 is used to decode the transmitted data, which are checked and mitigated through a receiver error detection module 80. Specifically, the calculated error protection bits from the receiver error detection module 80 are compared with the error protection bits from the error protection decoder 78 to determine the bad data frames, which are then mitigated. Once the data errors have been detected and mitigated, the speech data are then decompressed using a speech de-compressor 82. The decompressed data are similarly ran though a digital to analog converter 84 located in the receiver for translation back to analog data and outputted to a user via a loud speaker 86.

Figure 4:
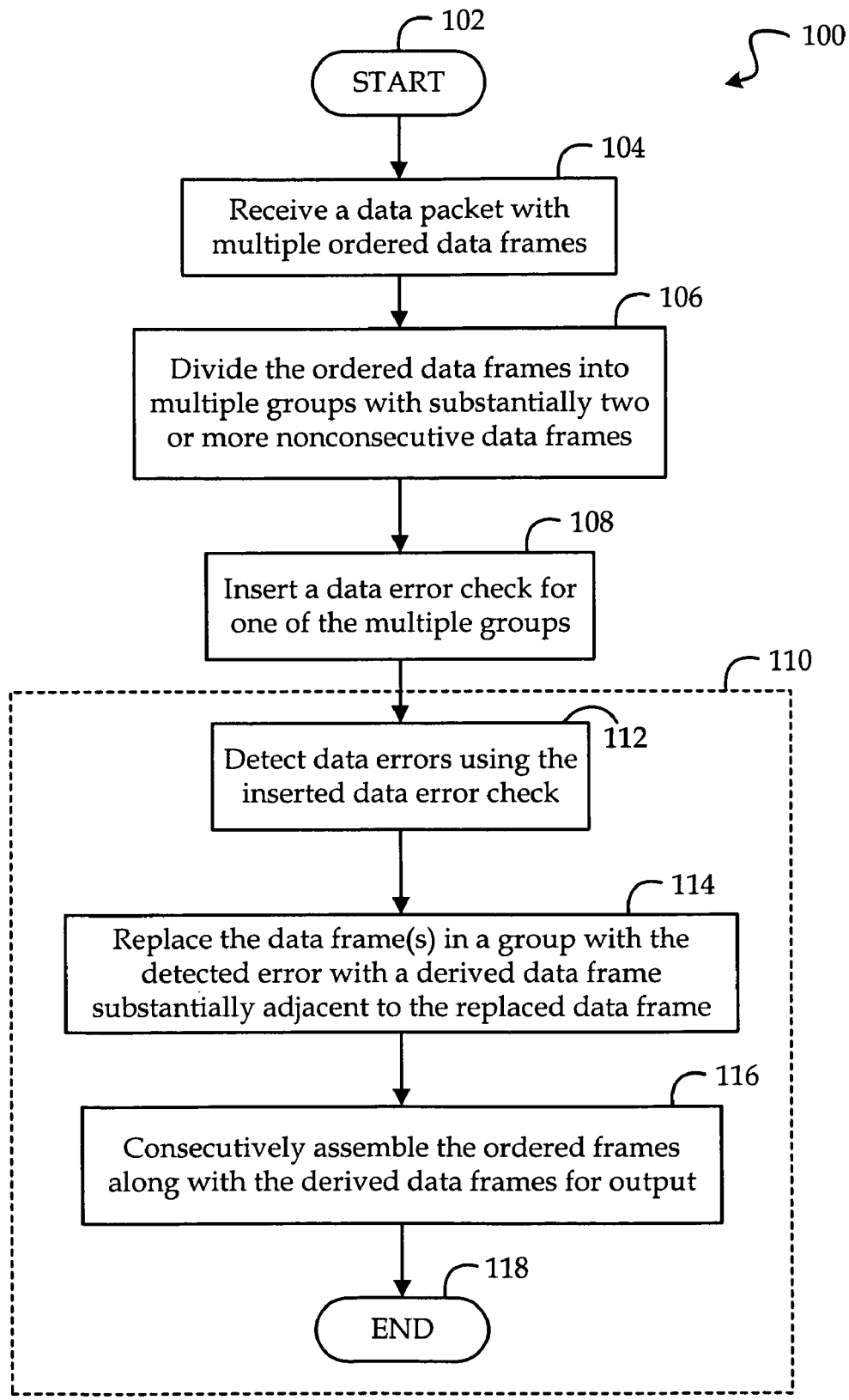
FIG. 4 comprises a flow diagram of a data error detection process according to an embodiment of the invention.

Referring now to FIG. 4, a detection and mitigation process according to one embodiment is shown and indicated generally at 100, which can be implemented in the error detection modules 58, 80 shown in FIGS. 2 and 3. The process is initiated 102 with a data packet having multiple ordered data frames being received 104. In the example shown in FIGS. 2 and 3, the data packet with multiple ordered data frames is received 104 from the speech compressor 56 in the transmitter 50 and the error protection decoder 78 in the receiver 70. According to various embodiments, the data are preferably a packet with multiple ordered data frames. Although the data packets generally arrived to the process in that format, they can also be divided into multiple ordered data frames by the process.

Once the data packet is received 104 in the format of multiple ordered data frames, the ordered data frames are further divided 106 into multiple groups, wherein one or more groups include at least two nonconsecutive data frames. A data error check is inserted 108 to one of the multiple groups. Depending on the various implementations, a data error check may be preferred for each of the multiple groups. Moreover, according to various embodiments, because there are multiple ordered data frames in each data packet, the multiple groups are preferably divided into a substantially equal number of data frames in each of the groups. The two or more nonconsecutive frames in each or one of the group(s) can also be spaced according to a predefined number of frames. For example, if the number of data frames is even, each group can contain four, as an example, nonconsecutive data frames in each group where each frame in the group is spaced apart by two frames. In this example, the groups have an equal number of data frames in each group. Using this same example with an odd number of data frames, however, there would be one group that is different from the other groups to account for the odd number. As shown, the data frames can be divided hundreds of ways into multiple groups, and these various permutations and combinations are readily appreciated by a skilled artisan and are within the scope the present teachings. One of the central features, according to these various embodiments, is that at least one of the groups includes at least two nonconsecutive data frames.

Turning back to the process shown in FIG. 4, the mitigation subroutine 110 continues in the process. Because most transmitters do not encounter a situation where the data are corrupt at the transmission end, this subroutine is generally implemented in the receiver. However, there may be implementations when the mitigation process would be desired at the transmitter end as well. Both implementations of the transmitters and receivers are contemplated, and the steps of the process needed will highly depend on the configuration of the system, which would be readily appreciated by a skilled artisan. As a result, these other implementations are within the scope of these teachings.

The mitigation process, whether it is implemented in a transmitter or receiver, ensures that the corrupted data (e.g., data errors) are detected 112 and mitigated 114 using the data error check that was inserted 108. According to this particular embodiment, the data error is mitigated 114 by replacing the data frames in a group with the detected error with a derived data frame that is substantially adjacent to each data frame being replaced. For example, a derived data frame that is N frames previous from or next to the data frame being replaced is acceptable where N can be any number that is greater than 1. In one specific embodiment, the derived data frame is a data frame that is derived from an immediate previous or next frame of the data frame being replaced. Because the substitute data frame (e.g., derived data frame) may or may not be exactly the same as the frame adjacent to the replaced frame, a derived data frame is used to represent a data frame that is the same or a variation of the frame that is chosen as the substitute data frame. Some variations of the derived data frame may include alternations of the substitute data frame, such as a slight decrease in volume to lessen the abrupt transition. There may be other variations that may be helpful in making the replaced data frame less noticeable. Again, these other variations are within the scope of these teachings. Going back to this particular embodiment, the ordered frames along with derived data frames are then consecutively assembled 116 for output, which completes the process 118.

Figure 5:
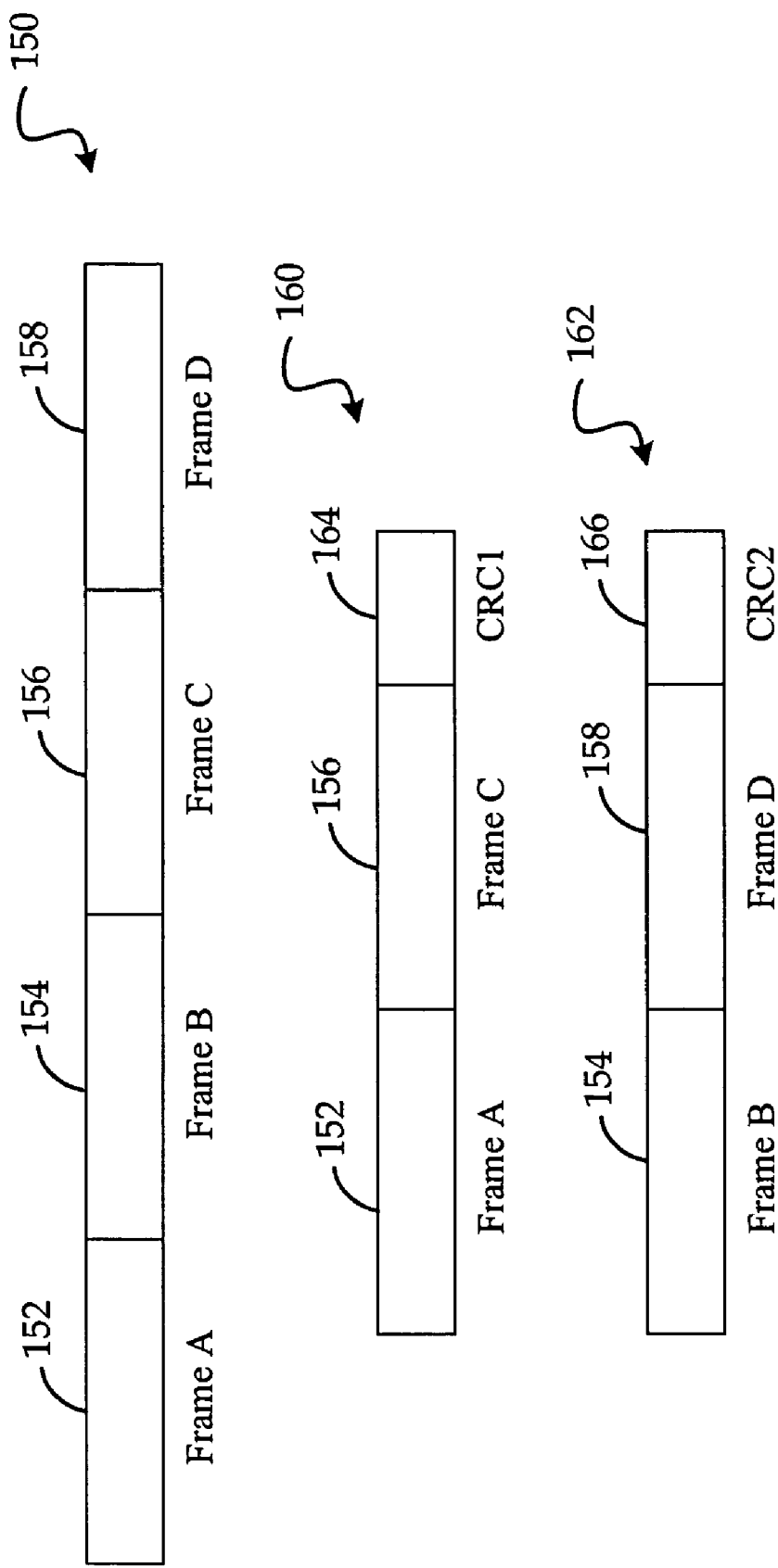
FIG. 5 comprises a block diagram of a data error detection structure using four exemplary data frames according to an embodiment of the invention.

Turning now to FIG. 5, a block diagram of the data error detection structure using four exemplary data frames is shown and indicated generally at 150. As shown, the four frames A 152, B 154, C 156, and D 158 are divided into two groups 160, 162 with each group containing two nonconsecutive data frames. Specifically, group 160 includes data frames A 152 and C 156, and group 162 includes data frames B 154 and D 158. A data error check (e.g., CRC1) 164 is inserted in group 160, and a second data error check (e.g., CRC2) 166 is inserted in group 162. A particular example of four data frames being divided according to one particular embodiment has been shown. Specifically, in this embodiment, the nonconsecutive data frames in each group are spaced by one data frame (e.g., N=1), and each group includes substantially two data frames. In this case, if there is a fifth data frame E (not shown), there would be another group that contains only one data frame, which would also include a data error check.

Figure 6:
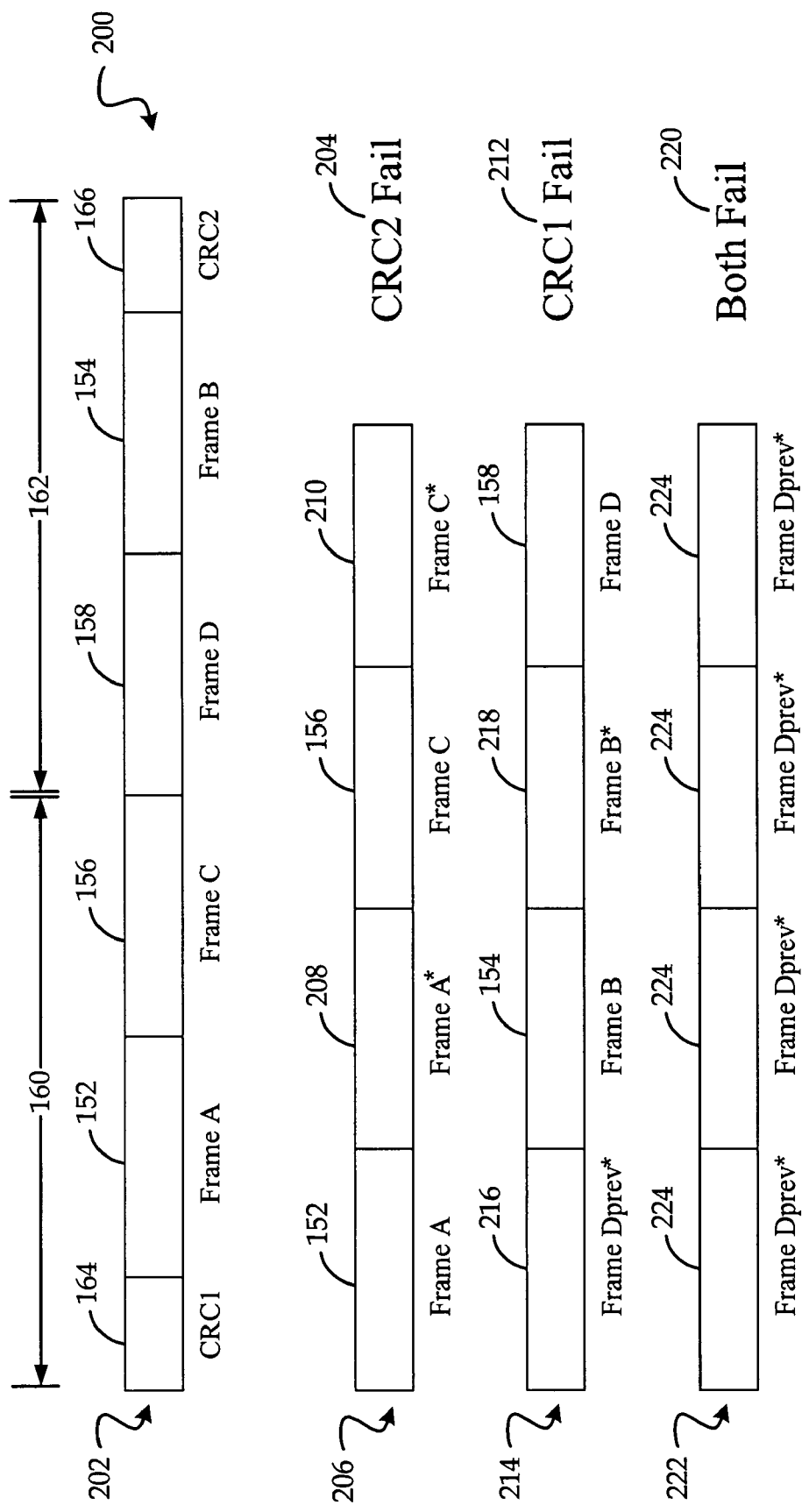
FIG. 6 comprises a block diagram of a data error mitigation structure using the four exemplary data frames shown in FIG. 5 according to an embodiment of the invention.

Once the groups are divided, FIG. 6 shows a block of the mitigation structure using the example shown in FIG. 5, which is generally indicated at 200. Group 160, which includes CRC1 164 and nonconsecutive data frames A 152 and C 156, are assembled with group 162, which includes CRC2 166 and nonconsecutive data frames D 158 and B 154, are shown as a single data bit stream 202. The data frames A 152, B 154, C 156, and D 158 are assembled consecutively into a single data bit stream if no errors were detected. Otherwise, if only the CRC2 166 fails 204 in the data bit stream 202, the data frames A 152 and C 156 from group 160 remain intact in an output data stream 206 since an error was not found in CRC1 164. Date frames B 154 and D 158, however, are respectively replaced with derived data frames A* 208 and C* 210. Specifically, in this embodiment, an immediate previous data frame from the data frame being replaced is chosen as the substitute data frame, which generates a derived version of the substitute data frame that may or may not be the same data frame. The output data stream 206 ultimately becomes data frame A 152, derived data frame A* 208, data frame C 156, and a derived data frame C* 210. On the other hand, if only CRC1 164 fails 212, an output bit stream 214 is assembled to include, in order, a derived data frame D* from a previous packet (e.g., Frame Dprev*) 216 for replacing data frame A 152, the data frame B 154, a derived frame B* of this current packet 218, and the data frame D 158. Finally, if both the CRC1 164 and CRC2 166 failed 220, an output bit stream 222, which includes four data frames of a same derived data frame D* from the previous packet 224, is outputted as a mitigated data bit stream. In this case, though, it may be more desirable to simply mute out the data frames if this relates to speech data frames, since the whole data packet is corrupt. Although these frames may be all derived from frame D, they can exhibit different levels of muting.

Figure 7:
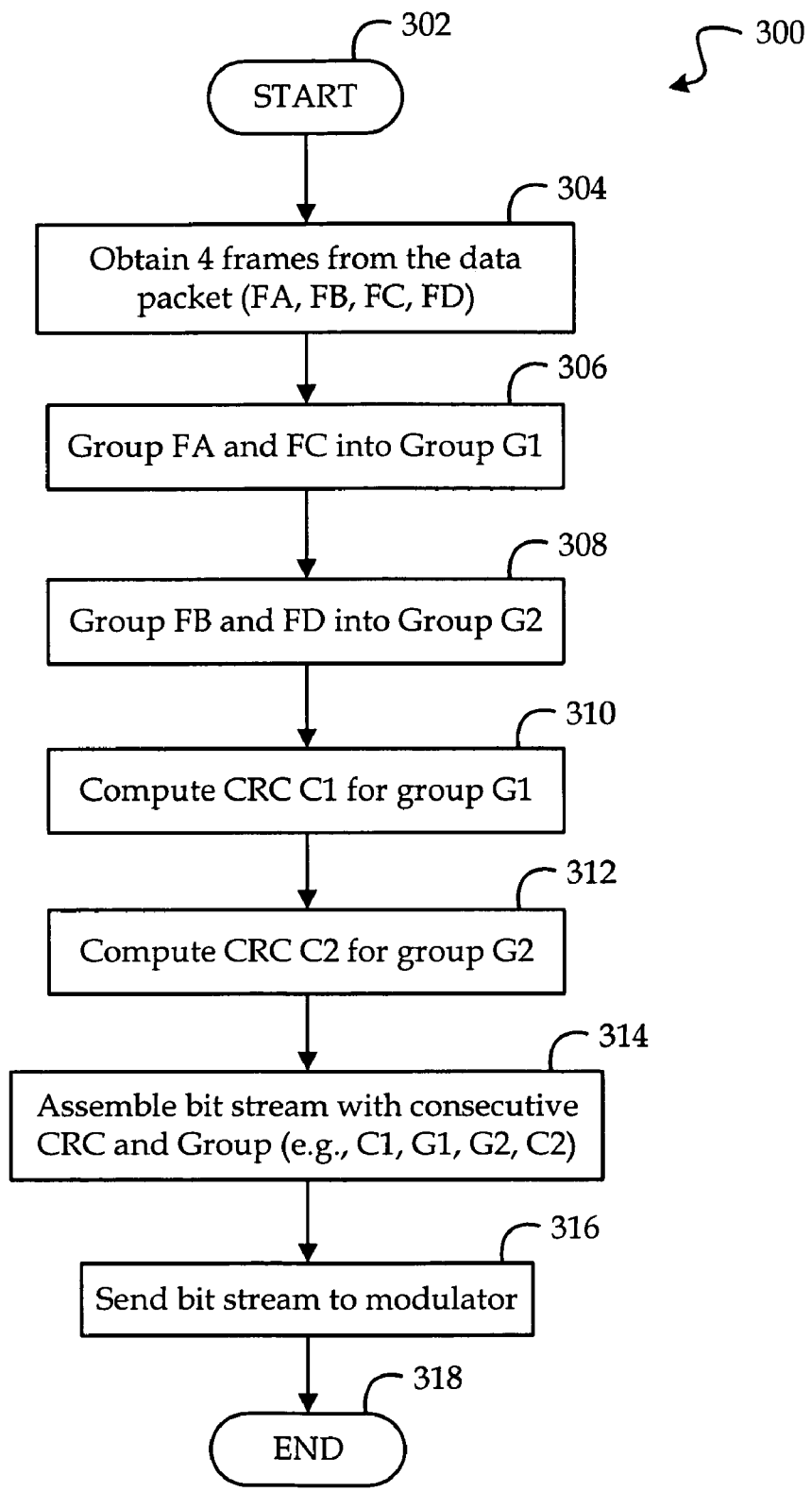
FIG. 7 comprises a flow diagram of a transmission process configured in accordance with an embodiment of the invention using the four exemplary data frames shown in FIGS. 4 and 5.

Turning to FIG. 7, a flow diagram of a transmission process 300 using the data frames A, B, C, and D shown in FIGS. 5 and 6 is shown as an example. The process starts 302 by obtaining 304 the four data frames FA, FB, FC, and FD of a data packet from another module in the transmitter. Because the transmitted data frames may not be the same as the data frames that will be received, "F" has been inserted to indicate that these are data frames from the transmitter that are to be "Forwarded" to a receiver. Accordingly, data frames FA and FC are grouped 306 into Group G1, and data frames FB and FD are grouped 308 into Group G2. A CRC bit C1 and C2 are respectively computed 310, 312 for groups GI and G2. Typically, multiple CRC bits are included, but for the sake of clarity, a single CRC bit is referred to for easy reference. Please note that, however, CRC bit refers at least one bit and/or a group of bits. Groups G1 (e.g., FA and FC) and G2 (e.g., FB and FD) are assembled 314 along with the CRC bits C1 and C2 to create a data bit stream that is to be sent or transmitted 316 to another modulator in the receiver. The process for the transmitter ends 318 at this point.

Figure 8:
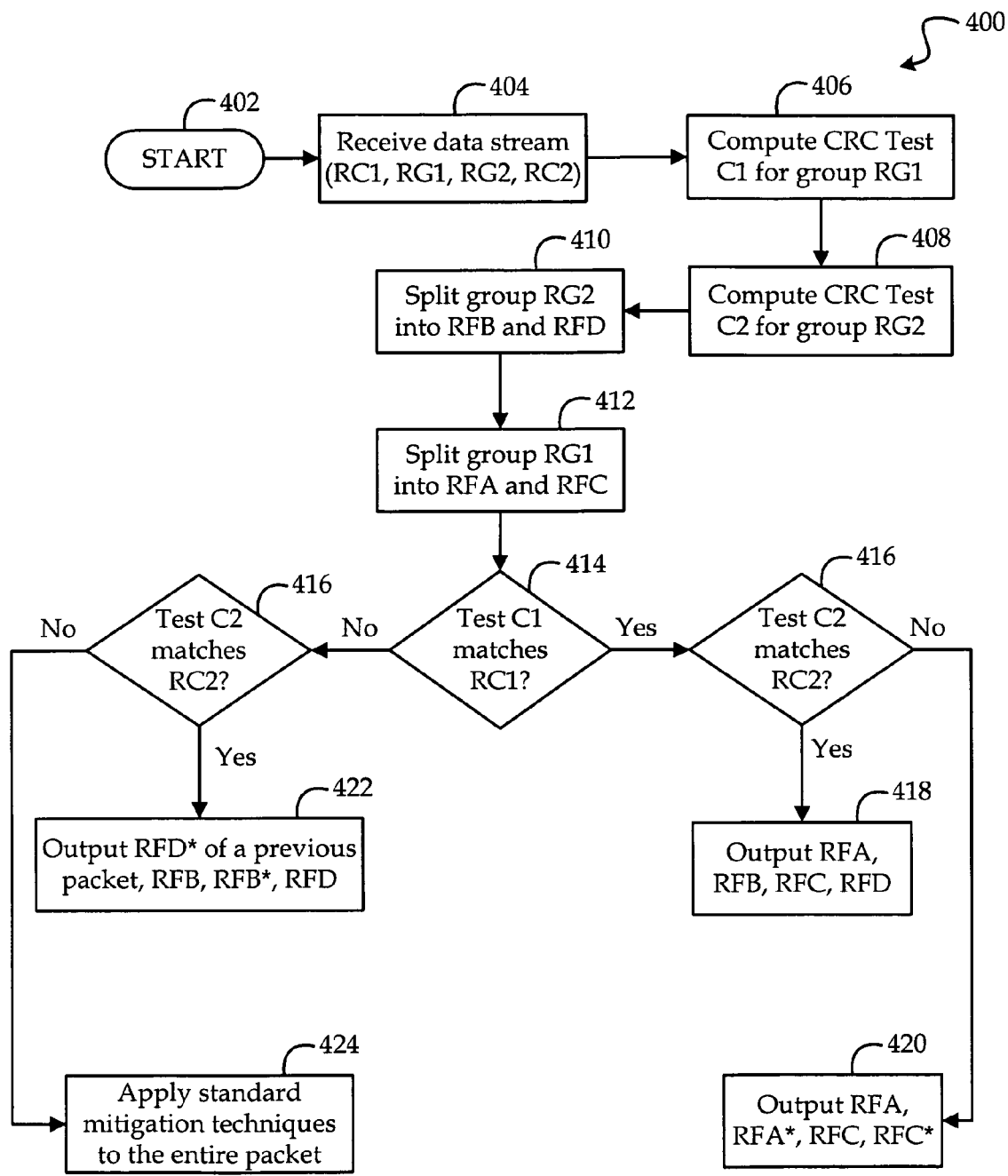
FIG. 8 comprises a flow diagram of a receiving process configured in accordance with an embodiment of the invention using the four exemplary data frames shown in FIGS. 4 and 5.

Referring now to FIG. 8, a similar flow diagram of a receiving process 400 is shown as an example for the four data frames A, B, C, and D. The process initiates 402 by a data stream being received 404, which specifically includes CRC C1 bit (e.g., RC1), Group G1 (e.g., RG1), Group G2 (e.g., RG2), and CRC C2 bit (e.g., RC2) in this example. Again, to distinguish the transmitted and received groups G1 and G2 and CRC bits C1 and C2, an "R" has been included to represent "Received" data. With the received data stream, a CRC test bit C1 and C2 are computed 406, 408 respectively for groups RG1 and RG2. Group RG2 is split 410 into received data frames RFB and RFD, and Group RG1 is similarly split 412 into received data frames RFA and RFC. The computed test C1 bit is then compared 414 to the RC1 bit that was received with the data bit stream to determine whether they match each other. If test C1 matches 414 RC1, the process next compares 416 test C2 with RC2 to determine whether they match, as excepted. If test C2 also matches 416 RC2, no data error has resulted from the transmission, which would be the best case scenario. The process simply outputs 418 the data as they were received (e.g., data frames RFA, RFB, RFC, RFD). Otherwise, when an error is detected 416 for group RG2 (e.g., C2 does not match RC2), the process outputs 420 a bit stream data of data frames A, derived A*, C, and derived C*. This completes the subroutine when C1 matches RC1.

In the case when, however, test C1 does not match 414 RC1, the process similarly determines whether test C2 matches 416 RC2. The outputs would be different from the previous subroutine, since an error in Group G1 has already been detected. Data frames A and B in group G1 will be replaced with a derived data frame D* from a previous packet and a derived data frame B. So, if test C2 matches RC2, the data bit stream outputted 422 would include a derived data frame D* from a previous packet (e.g., RFD* of a previous packet), data frame B as received (e.g., RFB), a derived data frame B (e.g., RFB*), and data frame D as received (e.g., RFD). Otherwise, since both CRC produced an error for Groups RG1 and RG2, which accounts for the entire data stream received being corrupted, standard mitigation techniques would be applied 424 to the entire packet. Through the use of FIGS. 5, 6, 7, and 8, an implementation using four data frames has been shown and described in detail in order to give a clear description of a particular example. Because there may literally be hundreds of ways to implement these teachings using different parameters and combinations, it is impractical to show all the various available embodiments. Nonetheless, because these various implementations are readily appreciated by a skilled artisan, they are contemplated and within the scope of the invention.

With that understanding, an improved error detection and mitigation technique has been provided through the use of the various teachings shown. The data frames are divided into multiple groups in such a way that a tiered detection system has been provided. Thus, more accurate error detections are available, and the audio artifacts are compensated more seamlessly when errors are in fact detected. Instead of muting corrupt data errors, various embodiments are able to allow for valid repetitions in cases where muting would otherwise have been necessary. The overall audio effect of mitigation is reduced and the voice quality is increased through these various embodiments. Moreover, the audio artifacts are replaced with derived data frames that are closer in time to the original data frames, rather than a single large block of the data being either repeated or muted. As a result, an improved error detection and mitigation system has been provided.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of detecting data error comprising:
   receiving data divided into a plurality of ordered data frames;
   dividing the ordered data frames into multiple groups, wherein at least one of the multiple groups comprises at least two nonconsecutive data frames;
   inserting a data error check in at least one of the multiple groups;
   detecting data errors using the data error check; and
   mitigating the detected data errors by replacing at least one data frame from a group with the detected data errors with a derived data frame substantially adjacent to the at least one data frame being replaced.

2. The method according to claim 1, wherein the derived data frame is derived from any one or more from a group comprising of an immediate previous data frame and an immediate next data frame of the at least one data frame being replaced.

3. The method according to claim 1 further comprising consecutively assembling the ordered data frames along with the derived data frames for output.

4. The method according to claim 1, wherein the data comprises any one or more from a group of audio information, speech information, video information, image information, file information, and any data format with substantial similarity between successive frames.

5. The method according to claim 1, wherein the multiple groups have a substantially equal number of data frames in each of the multiple groups.

6. The method according to claim 1, wherein the at least two nonconsecutive data frames are spaced according to a predefined number of frames.

7. A method of detecting speech data error comprising:
   receiving a plurality of data packets, wherein each data packet includes multiple ordered speech frames;
   dividing the multiple ordered speech frames into a plurality of groups, wherein at least one of the plurality of groups comprises at least two nonconsecutive data frames;
   inserting a data error check in at least one of the multiple groups;
   detecting data errors using the data error check; and
   mitigating the detected data errors by replacing the at least one data frame with a derived data frame substantially adjacent to the at least one data frame being replaced.

8. The method according to claim 7, wherein the plurality of groups has a substantially equal number of data frames in each of the plurality of groups.

9. The method according to claim 7, wherein the at least two nonconsecutive data frames are spaced according to a predefined number of frames.

10. An apparatus comprising:
    an input having a plurality of ordered data frames;
    an error detection device coupled to the input that divides the ordered data frames into multiple groups and inserts a data error check in at least one of the multiple groups, wherein at least one of the multiple groups comprises at least two nonconsecutive data frames; and
    a mitigation device coupled to the error detection device that detects data error from the data error check and mitigates the detected data errors, wherein the mitigation device mitigates the detected data errors by replacing at lease one data frame from a group with the detected data error with a derived data frame substantially adjacent to the at least one data frame.

* * * * *